United States Patent
Mantin et al.

(10) Patent No.: US 11,483,291 B2
(45) Date of Patent: Oct. 25, 2022

(54) PREDICTIVE ACTIVATION OF SECURITY RULES TO PROTECT WEB APPLICATION SERVERS AGAINST WEB APPLICATION LAYER ATTACKS

(71) Applicant: Imperva, Inc., Redwood City, CA (US)

(72) Inventors: Itsik Mantin, Shoham (IL); Ori Or-Meir, Tel-Aviv (IL)

(73) Assignee: Imperva, Inc., San Mateo, CA (US)

( * ) Notice: Subject to any disclaimer, the term of this patent is extended or adjusted under 35 U.S.C. 154(b) by 192 days.

(21) Appl. No.: 16/730,955

(22) Filed: Dec. 30, 2019

(65) Prior Publication Data

US 2021/0203641 A1    Jul. 1, 2021

(51) Int. Cl.
*H04L 9/40* (2022.01)
*G06N 5/04* (2006.01)

(52) U.S. Cl.
CPC .......... *H04L 63/0281* (2013.01); *G06N 5/04* (2013.01); *H04L 63/1441* (2013.01); *H04L 63/20* (2013.01)

(58) Field of Classification Search
CPC . H04L 63/0281; H04L 63/1441; H04L 63/20; H04L 63/1408; H04L 63/0263; H04L 63/0245; H04L 63/1416; H04L 63/0227; G06N 5/04; G06F 21/00; G06F 21/552; H04W 12/08; H04W 12/088
See application file for complete search history.

(56) References Cited

U.S. PATENT DOCUMENTS

| | | | | |
|---|---|---|---|---|
| 8,676,127 B2* | 3/2014 | Stalnacke | ............. | H04W 24/08 455/67.11 |
| 10,785,243 B1* | 9/2020 | Han | ........................ | G06N 7/005 |
| 2007/0169185 A1* | 7/2007 | Readshaw | ........... | H04L 63/0884 726/12 |
| 2010/0011027 A1* | 1/2010 | Cox | ........................ | G06Q 10/06 707/E17.005 |
| 2018/0091474 A1* | 3/2018 | Tulasi | ..................... | H04L 63/02 |
| 2020/0028821 A1* | 1/2020 | Weisshaupt | ......... | H04L 63/0263 |
| 2021/0029146 A1* | 1/2021 | Kancherla | ........... | H04W 12/088 |

(Continued)

OTHER PUBLICATIONS

Huang et al., "Predictive dynamic security assessment through advanced computing," 2014 IEEE PES General Meeting | Conference & Exposition Year: 2014 | Conference Paper | Publisher: IEEE.*

(Continued)

*Primary Examiner* — Roderick Tolentino
(74) *Attorney, Agent, or Firm* — Nicholson, De Vos, Webster & Elliott, LLP (57) ABSTRACT

A method by a web application layer proxy for predictively activating security rules to protect one or more web application servers from attacks by one or more web application clients. The method includes applying a set of security rules to web application layer requests received from the one or more web application clients that are intended for the one or more web application servers, determining a set of recently triggered security rules, where the set of recently triggered security rules includes those security rules in the set of security rules that were triggered within a most recent period of time, applying a prediction model to the set of recently triggered security rules to determine one or more security rules that are predicted to be triggered, and activating the one or more security rules.

20 Claims, 6 Drawing Sheets

(56) References Cited

U.S. PATENT DOCUMENTS

| | | | |
|---|---|---|---|
| 2021/0036991 A1* | 2/2021 | Owens | H04L 63/0236 |
| 2021/0036993 A1* | 2/2021 | Pang | H04L 63/20 |
| 2021/0203674 A1* | 7/2021 | Azaria | H04L 63/1408 |

OTHER PUBLICATIONS

Rahman et al., "Predicting Android Application Security and Privacy Risk with Static Code Metrics," 2017 IEEE/ACM 4th International Conference on Mobile Software Engineering and Systems (MOBILESoft) Year: 2017 | Conference Paper | Publisher: IEEE.*

"Word2Vec Variant for Analytics of Web Attacks," Dec. 2-5, 2019, 7 pages, blackhat arsenal, Mal2vec, Excel London, United Kingdom.

GitHub—imperva / mal2vec, 3 pages, downloaded from https://github.com/imperva/mal2vec on Sep. 25, 2020.

Itsik Mantin et al., "Mal2Vec: How NLP Can Help Us Understand Web Attacker," 2019, 24 pages, Global Appsec Tel Aviv, Imperva.

* cited by examiner

SECURITY RULES 150

NON-FUZZY SECURITY RULES 160

| ID | CONDITION | ACTION(S) |
|---|---|---|
| 1000 | THE REQUEST QUERY STRING INCLUDES THE APOSTROPHE CHARACTER AND THE KEYWORDS "UNION" AND "SELECT" | BLOCK |
| 1001 | THE REQUEST QUERY STRING INCLUDES THE APOSTROPHE CHARACTER AND THE KEYWORDS "DROP ALL TABLES" | BLOCK |
| ... | ... | ... |

- NON-FUZZY SECURITY RULE 160A (ID 1000)
- NON-FUZZY SECURITY RULE 160B (ID 1001)
- ...

FUZZY SECURITY RULES 170

| ID | CONDITION | ACTION(S) |
|---|---|---|
| 2000 | THE REQUEST QUERY STRING INCLUDES THE APOSTROPHE CHARACTER AND THE KEYWORDS "ON" AND "--" | BLOCK |
| 2001 | A REQUEST PARAMETER THAT IS KNOWN TO BE AN INTEGER TYPE HAS A VALUE THAT INCLUDES NON-DIGIT CHARACTERS | BLOCK |
| ... | ... | ... |

- FUZZY SECURITY RULE 170A (ID 2000)
- FUZZY SECURITY RULE 170B (ID 2001)
- ...

```
┌─────────────────────────────────────────────────────────────────────┐
│   OBTAIN DATA REGARDING SEQUENCES OF SECURITY RULES THAT WERE       │
│   PREVIOUSLY TRIGGERED AT ONE OR MORE WEB APPLICATION LAYER PROXIES 510 │
└─────────────────────────────────────────────────────────────────────┘
                                  │
                                  ▼
┌─────────────────────────────────────────────────────────────────────┐
│   GENERATE A PREDICTION MODEL BASED ON ANALYZING THE SEQUENCES OF   │
│ SECURITY RULES THAT WERE PREVIOUSLY TRIGGERED AT THE ONE OR MORE WEB│
│                   APPLICATION LAYER PROXIES 520                     │
│                                                                     │
│   NATURAL LANGUAGE PROCESSING APPROACH:                             │
│   ┌─────────────────────────────────────────────────────────────┐   │
│   │  REPRESENT SECURITY RULES AS WORDS, REPRESENT THE SEQUENCES │   │
│   │      OF SECURITY RULES THAT WERE PREVIOUSLY TRIGGERED AS    │   │
│   │      SENTENCES, AND APPLY A NATURAL LANGUAGE PROCESSING     │   │
│   │   ALGORITHM TO THE SENTENCES TO ARRANGE THE SECURITY RULES IN A │
│   │   VECTOR SPACE, WHERE DISTANCES BETWEEN SECURITY RULES IN THE │ │
│   │   VECTOR SPACE REPRESENT A LIKELIHOOD THAT THOSE SECURITY RULES │
│   │     ARE TRIGGERED IN THE SAME CONTEXT (A WEB APPLICATION LAYER │
│   │     PROXY MAY APPLY THE PREDICITION MODEL TO A SET OF RECENTLY │
│   │    TRIGGERED SECURITY RULES BY DETERMINING WHICH SECURITY RULES│
│   │   ARE WITHIN A PREDEFINED DISTANCE IN THE VECTOR SPACE FROM THE│
│   │      SECURITY RULES IN THE SET OF RECENTLY TRIGGERED SECURITY  │
│   │                            RULES) 530                         │
│   └─────────────────────────────────────────────────────────────┘   │
│                                                                     │
│   BAYESIAN APPROACH:                                                │
│   ┌─────────────────────────────────────────────────────────────┐   │
│   │    DETERMINE CONDITIONAL PROBABILITIES FOR PAIRS OF SECURITY│   │
│   │   RULES IN THE SEQUENCES OF SECURITY RULES THAT WERE PREVIOUSLY│
│   │      TRIGGERED, WHERE A CONDITIONAL PROBABILITY FOR A PAIR OF │
│   │      SECURITY RULES INDICATES A PROBABILITY THAT A FIRST SECURITY│
│   │      RULE IN THE PAIR OF SECURITY RULES WILL BE TRIGGERED WITHIN A│
│   │     PREDEFINED PERIOD OF TIME AFTER A SECOND SECURITY RULE IN THE│
│   │      PAIR OF SECURITY RULES IS TRIGGERED (A WEB APPLICATION LAYER│
│   │      PROXY MAY APPLY THE PREDICTION MODEL TO A SET OF RECENTLY │
│   │        TRIGGERED SECURITY RULES BY DETERMINING, BASED ON THE │
│   │     CONDITIONAL PROBABILITIES, SECURITY RULES HAVING A PROBABILITY│
│   │    THAT IS HIGHER THAN A PREDEFINED THRESHOLD PROBABILITY OF BEING│
│   │        TRIGGERED WITHIN THE PREDEFINED PERIOD OF TIME AFTER THE │
│   │     SECURITY RULES IN THE SET OF RECENTLY TRIGGERED SECURITY RULES│
│   │                    HAVE BEEN TRIGGERED) 540                    │
│   └─────────────────────────────────────────────────────────────┘   │
└─────────────────────────────────────────────────────────────────────┘
                                  │
                                  ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
  PROVIDE THE PREDICTION MODEL TO A WEB APPLICATION LAYER PROXY, WHERE
│    THE WEB APPLICATION PROXY IS TO APPLY THE PREDICTION MODEL TO   │
            PREDICTIVELY ACTIVATE SECURITY RULES  550
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
```

PREDICTIVE ACTIVATION OF SECURITY RULES TO PROTECT WEB APPLICATION SERVERS AGAINST WEB APPLICATION LAYER ATTACKS

TECHNICAL FIELD

Embodiments of the invention relate to the field of computer network security, and more specifically, to predictively activating security rules to protect web application servers against web application layer attacks.

BACKGROUND

The content of Hypertext Transfer Protocol (HTTP) messages is transmitted within the application layer ("Layer 7") of the Open Systems Interconnection (OSI) model (ISO/IEC 7498-1), and may also be referred to as web application layer data. The OSI model was developed to establish standardization for linking heterogeneous communication systems and describes the flow of information from a software application of a first computer system to a software application of a second computer system through a communications network. The OSI model has seven functional layers including a physical link layer, a data link layer, a network layer, a transport layer, a session layer, a presentation layer, and an application layer. A few examples of application layer protocols include, but are not limited to, HTTP for web application communication, File Transfer Protocol (FTP) for file transmission, Internet Message Access Protocol (IMAP) and Post Office Protocol (POP) for email, Simple Mail Transfer Protocol (SMTP) for transmitting email, Internet Relay Chat (IRC) for real-time Internet text messaging, Session Initiation Protocol (SIP) for voice and video calling, and Network File System (NFS) for the remote access of files.

Another model detailing communications on the Internet is known as the Internet Protocol (IP) suite and is sometimes referred to as "TCP/IP." In contrast to the OSI model, the Internet protocol suite is a set of communications protocols including four layers: a link layer, an internet layer, a transport layer, and an application layer. The link layer of the Internet protocol suite, which provides communication technologies for use in a local network, is often described as roughly analogous to a combination of the data link layer (layer 2) and physical layer (layer 1) of the OSI model. The internet layer (e.g., IP version 4 (IPv4) and IP version 6 (IPv6)) of the Internet protocol suite, which provides for inter-networking and thus connects various local networks, is often described as roughly analogous to the network layer (layer 3) of the OSI model. The transport layer (e.g., Transmission Control Protocol (TCP), User Datagram Protocol (UDP)) of the Internet protocol suite, which allows for host-to-host communications, is often described as roughly analogous to the transport layer (layer 4) of the OSI model. Finally, the application layer of the Internet protocol suite includes the various protocols (e.g., HTTP, IMAP, FTP, SIP) for data communications on a process-to-process level and is often described as analogous to a combination of the session, presentation, and application layers (layers 5-7, respectively) of the OSI model.

Regardless of the model considered, many common attacks are targeted at aspects of the network layer, the transport layer, and the application layer. The network layer, which is under the transport layer and routes data supplied by the transport layer, manages delivery of packets between computing devices that may be connected to different networks and separated by one or more other networks. The network layer is responsible for logical addressing, which includes managing mappings between IP addresses and computing devices on a worldwide basis. The network layer is also responsible for ensuring that packets sent to computing devices on different networks are able to successfully navigate through the various networks successfully and arrive at the proper intended destinations. Network devices such as routers and gateways predominantly operate at the network layer. The transport layer, which is under the application layer, provides end-to-end communication services by providing reliable delivery of an entire message from a source to a destination, sometimes using multiple packets. While the network layer typically handles each packet independently, the transport layer manages the relationships between the packets to ensure that the entire message arrives at the destination and can be reassembled in the correct order to recreate the original message. The application layer typically operates as the top layer in networking models and carries application-specific data, such as HTTP request and response messages.

Application layer attacks typically target web applications implemented by web application servers (in which case, they are referred to as web application layer attacks). A web application server is system software (running on top of an operating system) executed by server hardware upon which web applications run. Web application servers may include a web server (e.g. Apache, Microsoft® Internet Information Server (IIS), nginx, lighttpd), which delivers web pages on the request of web application clients (e.g., using HTTP), and may also include an application server that executes procedures (i.e., programs, routines, scripts) of a web application. Web applications are computer software applications made up of one or more files including computer code that run on top of web application servers and are written in a language the web application server supports. Web applications are typically designed to interact with web application clients by dynamically generating web application responses (e.g., HTTP response messages) responsive to web application requests (e.g., HTTP request messages) sent by those web application clients. Many web applications use databases (e.g., relational databases such as PostgreSQL, MySQL, and Oracle, and non-relational databases, also known as NoSQL databases, such as MongoDB, Riak, CouchDB, Apache Cassandra and HBase) to store information received from web application clients and/or information to be displayed to web application clients.

Web applications clients access web applications by sending web application layer requests to web application servers, which execute portions of web applications and return web application data/content (e.g., HyperText Markup Language (HTML) page) in the form of web application layer responses (e.g., HTTP response messages) back to the web application clients, where the web application data/content may be rendered by the web application clients. The web application data/content may include, for example, public web pages (e.g., free content, store fronts, search services) and/or private web pages (e.g., username/password accessed web pages providing email services). Thus, web applications may be provided using a request-response protocol (e.g., HTTP) in a client-server computing model, where the web application servers typically act as the "server" and the web application clients typically act as the "client." By way of an operational example, a web application client may request a web page from a web application server by sending it an HTTP request message. For example, to access the web page corresponding to the Uniform Resource Locator (URL) of "http://www.example.org/index.html", the web browser may connect to the web application server at www.example.org by sending it an HTTP request message using a "GET" method, which may look like the following:
GET/index.html HTTP/1.1
Host: www.example.org The web application server may reply by sending a set of HTTP headers along with the requested web page, which collectively is called an HTTP response message.

Many web applications use databases to store and provide data used by the web application, including but not limited to user data (passwords, user names, contact information, credit card information, web application history, etc.) and other site-specific data including but not limited to stories, comments, pictures, product information, sales information, financial records, and any other type of information used by or displayed by a web application. Because these databases often store confidential or private information, the databases are often configured to only provide access to the data stored therein to a limited number of users, geographic locations, and/or computing devices.

However, due to the sensitive and important data in these databases, they are often targeted by third parties seeking unauthorized, and possibly malicious access. For example, attackers may attempt access data of a web application by performing a variety of attacks on the web application servers such as SQL Injection attacks, Remote Code Execution (RCE) attacks, Remote File Inclusion (RFI) attacks, Cross-Site Scripting (XSS) attacks, Cross-Site Request Forgery (CSRF) attacks, file upload attacks, backdoor communication attacks, Remote File Inclusion (RFI) attacks, and directory traversal attacks.

Given this reality, security devices such as web application firewalls are commonly deployed to look for and prevent such attacks within web application layer traffic (e.g., HTTP traffic). In particular, a web application firewall can examine traffic (e.g., on a packet-by-packet basis) using a set of security rules to detect attacks of certain attack types. Each security rule typically includes a rule identifier (ID), which serves to uniquely identify that particular rule. Each security rule also typically includes a set of one or more conditions that define what to look for in traffic and a set of one or more actions to be performed when the conditions are satisfied. A condition may be specified using one or more attributes. An attribute is a combination of an attribute identifier and a set of one or more attribute values. Attribute identifiers can identify particular protocol headers (e.g., a TCP header, an HTTP header) and/or header fields (e.g., a source or destination port of a TCP header and a Referer HTTP header field) used within a packet. Attribute identifiers can also identify metrics or characteristics of traffic that an attribute value represents. For example, an attribute identifier may be a number of packets or HTTP messages received over a defined period of time, and the corresponding attribute value may be that particular number of packets or HTTP messages. Of course, the use of metrics or characteristics as attribute identifiers requires that the system have some way of determining the attribute values, such as by maintaining a separate table or database with relevant data necessary to perform the computation. Attribute identifiers may also identify portions of application layer data carried by packets, such as an HTTP request message, an HTTP response message, a SQL query, etc. A condition may be specified as an exact match of an attribute value with a specific value or a set of values (e.g., look for blacklisted IP addresses), a pattern match of an attribute value against specific patterns (e.g., using regular expressions), and/or a deviation of an attribute value from a baseline (e.g., non-digit characters appearing in a field that was learned to be an integer type field).

As noted above, each security rule also includes one or more actions to be performed when the conditions of the security rule are satisfied (a security rule is said to be "triggered" when the condition of the security rule is satisfied). Actions can indicate one or more forwarding actions (e.g., drop the packet or message, temporarily hold the packet or message for further analysis, transmit the packet or message to a particular module or IP address, forward the packet or message to the intended destination, etc.) or modification actions (e.g., insert a value into the packet or message at a particular location, strip out a value from the packet or message, replace a value in the packet or message, etc.). Additionally, many other types of actions are well known to those of ordinary skill in the art (e.g., generate an alert to notify an administrator), and thus these examples are not exhaustive.

A web application firewall typically sits in front of web application servers to protect the web application servers from attacks by web application clients. The web application firewall can see the traffic being sent between the web application clients and the web application servers, including web application layer requests (e.g., HTTP request messages) sent by the web application clients to the web application servers, and can scan these requests for attacks (e.g., based on applying security rules).

When a web application firewall sees a web application layer request being sent to a web application server, it scans the request for attacks (e.g., which may involve applying various security rules to the request, as mentioned above). If the web application firewall detects an attack in the request (e.g., a security rule is triggered), then it takes the appropriate security measures (e.g., perform the actions specified by the security rule that was triggered). Otherwise, if the web application firewall does not detect an attack in the request, then it sends the request to the web application server that the request is intended for.

A web application firewall typically applies security rules in "block" mode (e.g., block the traffic from proceeding towards the web application server) or "do not block" mode (e.g., generate an alert but allow the traffic to proceed towards the web application server). Some security rules are known to create false positives and thus a decision has to be made whether to apply such security rules in "block" mode, thereby harming usability (false positives will cause legitimate traffic to be blocked), or to apply such security rules in "do not block" mode (or not applying the security rule at all), which harms security (by allowing potentially malicious traffic to proceed towards the web application server). With web sites and web application layer attacks becoming more sophisticated, this problem is unlikely to disappear.

BRIEF DESCRIPTION OF THE DRAWINGS

The invention may best be understood by referring to the following description and accompanying drawings that are used to illustrate embodiments of the invention. In the drawings:

FIG. 5 is a flow diagram of a process for generating a prediction model, according to some embodiments.

DETAILED DESCRIPTION

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, and/or switching), and/or provide support for multiple application services (e.g., data, voice, and video).

As used herein, server end stations are network devices operable to execute or otherwise implement one or more servers providing content or services to clients. For example, server end stations may implement web application servers, database servers, file servers, print servers, mail servers, gaming servers, application servers, and/or Domain Name System (DNS) servers.

As used herein, client end stations (e.g., workstations, laptops, netbooks, palm tops, mobile phones, smartphones, multimedia phones, Voice over Internet Protocol (VoIP) phones, user equipment (UE), terminals, portable media players, Global Positioning Satellite (GPS) units, gaming systems, set-top boxes) are network devices operable to execute or otherwise implement applications that, among other functions, can access the content and/or services provided by servers over a network (e.g., over a local area network (LAN), over the Internet, and/or over virtual private networks (VPNs) overlaid on (e.g., tunneled through) the Internet).

As mentioned above, a web application firewall typically applies security rules in "block" mode (e.g., block the traffic from proceeding towards the web application server) or "do not block" mode (e.g., generate an alert but allow the traffic to proceed towards the web application server). Some security rules are known to create false positives and thus a decision has to be made whether to apply such security rules in "block" mode, thereby harming usability (false positives will cause legitimate traffic to be blocked), or to apply such security rules in "do not block" mode (or not applying the security rule at all), which harms security (by allowing potentially malicious traffic to proceed towards the web application server). With web sites and web application layer attacks becoming more sophisticated, this problem is unlikely to disappear.

Many types of web application layer attacks are performed using a sequence of malicious web application layer requests, which have an attack logic behind them. For example, web scanners typically send many requests using different Uniform Resource Locators (URLs) with different parameters in those URLs, which attempt to exploit different flavors of an attack (e.g., exploits of different Structured Query Language (SQL) injection vulnerabilities and exploits of different Cross Site Scripting (XSS) vulnerabilities). In many cases the scanning is performed in a telescopic nature—when a certain URL and a certain parameter in this URL are showing indications of being vulnerable, then the next web application layer request focuses on this URL and this parameter. As another example, some web application layer attacks are performed in phases. For example, a web application layer attack may be performed using a weaponization phase followed by an execution phase. In the weaponization phase, the attacker may perform a File Upload attack to install a malicious web shell/backdoor file in the web application server. Subsequently, in the execution phase, the attacker may attempt to access/execute the malicious file using a web shell/backdoor protocol (a backdoor attack).

In both of the attack examples given above, the sequence of web application layer requests have an attack logic behind them that can be seen as a flow of attack. Thus, the chance of a particular attack vector being launched against the web application may depend heavily on the previous attack vectors launched against the web application, either from the same source or from other sources. This is referred to herein as the context of the web application layer attack. Embodiments recognize the contextual relation between attack vectors and uses this contextual relation to focus security, as needed, which may help avoid the false positive and security tradeoff mentioned above.

An embodiment is a method by a web application layer proxy for predictively activating security rules to protect one or more web application servers from attacks by one or more web application clients, where the web application layer proxy is communicatively coupled between the one or more web application clients and the one or more web application servers. The method includes applying a set of security rules to web application layer requests received by the web application layer proxy from the one or more web application clients that are intended for the one or more web application servers, determining a set of recently triggered security rules, where the set of recently triggered security rules is a subset of the set of security rules applied by the web application layer proxy which includes those security rules in the set of security rules that were triggered within a most recent period of time, applying a prediction model to the set of recently triggered security rules to determine one or more security rules that are predicted to be triggered after the security rules in the set of recently triggered security rules have been triggered, and activating the one or more security rules to cause the web application layer proxy to apply the one or more security rules to future web application layer requests received by the web application layer proxy from the one or more web application clients that are intended for the one or more web application servers. Various embodiments are further described herein with reference to the accompanying figures.

Figure 1:
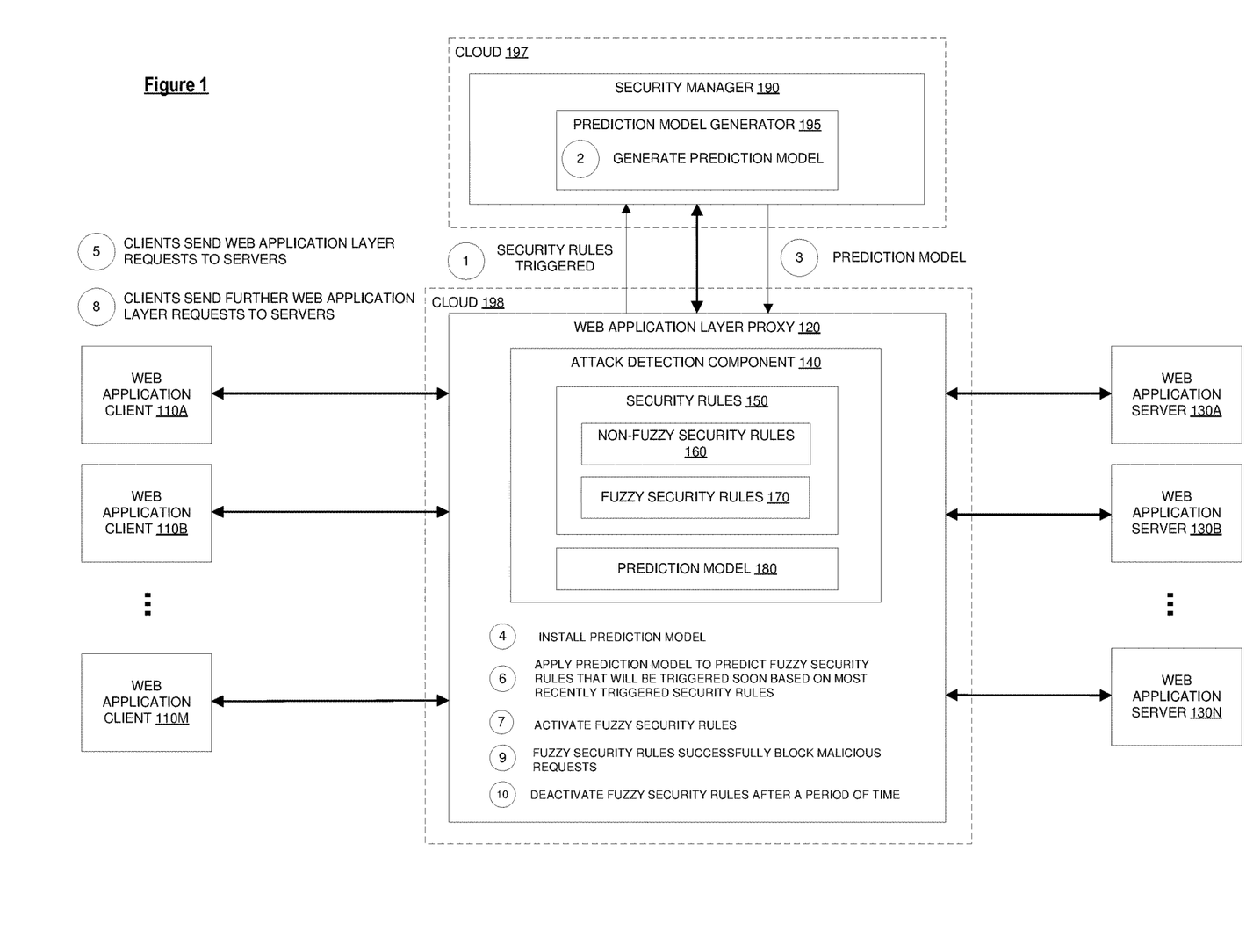
FIG. 1 is a block diagram of a system in which security rules can be predictively activated, according to some embodiments.

FIG. 1 is a block diagram of a system in which security rules can be predictively activated, according to some embodiments. As shown in the diagram, the system includes web application clients 110A-M, web application servers 130A-N, a web application layer proxy 120 that is communicatively coupled between the web application clients 110 and the web application servers 130, and a security manager 190 communicatively coupled to the web application layer proxy 120.

The web application clients 110 may access a web application implemented by the web application servers 130, for example, by generating one or more web application layer requests (e.g., Hypertext Transfer Protocol (HTTP) request messages such as a "POST" HTTP request messages or "GET" HTTP request messages) and sending these web application layer requests to the web application servers 130. In response to receiving web application layer requests, the web application servers 130 may send corresponding web application layer responses (e.g., HTTP response messages) containing the data/content of the web application to the web application clients 110. The web application clients 110 may then render the contents of the web application layer responses (e.g., on a display screen for an end user) or otherwise use the contents of the web application layer responses. Each of the web application clients 110 may be implemented by a client end station and each of the web application servers 130 may be implemented by one or more server end stations.

The web application layer proxy 120 is deployed in front of the web application servers 130 to protect the web application servers 130 from attacks by the web application clients 110. In one embodiment, the web application layer proxy 120 sits inline to the traffic being sent between the web application clients 110 and the web application servers 130 such that it can see the traffic being sent to the web application servers 130 (and possibly traffic being sent in the other direction by the web application servers 130 to the web application clients 110). In one embodiment, the web application layer proxy 120 implements a web application firewall. The web application layer proxy 120 may be implemented by one or more network devices.

As shown in the diagram, the web application layer proxy 120 includes an attack detection component 140, which includes security rules 150 and a prediction model 180. The attack detection component 140 may apply security rules 150 to the traffic intercepted or otherwise received by the web application layer proxy 120 to detect attacks (e.g., web application layer attacks) or potential attacks in the traffic. Each security rule may include a set of one or more conditions that define what to look for in traffic and a set of one or more actions to be performed when the conditions are satisfied. The conditions of a security rule may be specified, for example, as an exact match on one or more attribute values in the traffic (e.g., look for blacklisted IP addresses), a pattern match of one or more attribute values in the traffic (e.g., using regular expressions), and/or a deviation of one or more attribute values in the traffic from a baseline or expected value. The actions of a security rule may include, for example, dropping the traffic, modifying the traffic (e.g., sanitizing it so that it no longer poses a threat), sending a Completely Automated Public Turing test to tell Computers and Humans Apart (CAPTCHA) (e.g., to the web application client 110 that originated the web application layer request that caused the security rule to be triggered), and/or generating an alert to trigger another responsive event or to notify a user/administrator of the detection of malicious traffic. A security rule is said to be "triggered" when the conditions of the security rule are satisfied. The security rules 150 may be configured to detect a variety of web application layer attacks such as, but not limited to, Structured Query Language injection (SQLi) attacks, Cross-Site Request Forgery (CSRF) attacks, and Remote File Inclusion (RFI) Attacks.

As shown in the diagram, the security rules 150 include non-fuzzy security rules 160 and fuzzy security rules 170. As used herein, non-fuzzy security rules 160 are security rules that always remain activated (the web application layer proxy 120 always applies these security rules to traffic), whereas fuzzy security rules 170 are security rules that normally remain deactivated (e.g., the web application layer proxy 120 does not apply the security rule at all or applies the security rule in "do not block" mode) but are activated when they are predicted to be triggered soon (they are "predictively activated"). As will be described in further detail herein, the attack detection component 140 may use the prediction model 180 to predict when any of the fuzzy security rules 170 will be triggered soon and activate those fuzzy security rules 170 when they are predicted to be triggered soon.

The prediction model 180 is a computational model that given one or more security rules that have been recently triggered at the web application layer proxy 120 is able to predict one or more security rules that will be triggered soon. The prediction model 180 may be generated based on analyzing sequences of security rules that were previously triggered at the web application layer proxy 120 and/or at one or more other web application layer proxies (over a relative long period of time (e.g., over months or years)). In one embodiment, the prediction model 180 is generated using a natural language processing algorithm. For example, the prediction model 180 may be generated based on representing security rules as words, representing sequences of security rules that were previously triggered as sentences, and applying a natural language processing algorithm (e.g., Word2vec) to the sentences to arrange the security rules in a vector space, where distances between security rules in the vector space represent a likelihood that those security rules are triggered in the same context (e.g., close in time/order to each other). Such a prediction model 180 may be used to predict the security rules that will be triggered soon based on determining which security rules are close in distance (e.g., within a predefined distance) in the vector space to the security rules that were recently triggered (security rules that were triggered over a most recent period of time that is relatively short (e.g., security rules that were triggered in the last few seconds or minutes)). In another embodiment, the prediction model 180 is generated based on calculating conditional probabilities (a Bayesian approach). For example, the prediction model 180 may be generated based on calculating the conditional probabilities for pairs of security rules (where each pair of security rules includes a first security rule and a second security rule) in the sequences of security rules that were previously triggered, where the conditional probability for a pair of security rules indicates the probability that the first security rule in the pair of security rules will be triggered within a predefined period of time after the second security rule in the pair of security rules has been triggered. Such a prediction model 180 may be used to predict the security rules that will be triggered soon based on determining which security rules have a probability that is higher than a predefined threshold probability of being triggered within the predefined period of time after the security rules that were recently triggered. While a few examples of prediction model generation techniques have been described above, it should be understood that these examples are not exhaustive and that the prediction model 180 can be generated using other techniques (e.g., various machine learning techniques).

The security manager 190 is responsible for managing the security policies for the web application layer proxy 120. As shown in the diagram, the security manager 190 includes a prediction model generator 195, which can generate a prediction model 180. For example, the security manager 190 may receive data regarding sequences of security rules that were previously triggered at the web application layer proxy 120 and/or one or more other web application layer proxies (e.g., an ordered list of security rules that were previously triggered) and generate a prediction model 180 based on analyzing these sequences of security rules (e.g., using a natural language processing approach or a Bayesian approach, as described above). The security manager 190 may then provide the generated prediction model 180 to one or more web application layer proxies so that those web application layer proxies can use the prediction model 180 to predictively activate fuzzy security rules. While in some embodiments the security manager 190 generates and provides the prediction model 180 to the web application layer proxy 120, in other embodiments the web application layer proxy 120 generates the prediction model 180 itself (e.g., based on security rules previously triggered at the web application layer proxy 120). In one embodiment, the security manager 190 performs other functionality such as generating and providing security rules to one or more web application layer proxies so that those web application layer proxies can apply those security rules to traffic (this can be done during runtime (while the web application layer proxies are in operation) and/or before runtime).

The web application layer proxy 120 may install the prediction model 180 (e.g., which may have been generated and provided to the web application layer proxy 120 by the security manager 190 or generated by the web application layer proxy 120 itself) in the attack detection component 140. The attack detection component 140 may apply the non-fuzzy security rules 160 to the traffic received by the web application layer proxy 120 to detect attacks in the traffic while the fuzzy security rules 170 remain deactivated (and thus are not applied to the traffic). The attack detection component 140 may keep track of the security rules that have been recently triggered (e.g., triggered within the last N minutes) and apply the prediction model 180 to those security rules to predict which (if any) fuzzy security rules 170 will be triggered soon. The attack detection component 140 may then activate those fuzzy security rules (that were predicted to be triggered soon) such that the attack detection component 140 applies those fuzzy security rules to future traffic received by the web application layer proxy 120.

In one embodiment, the attack detection component 140 deactivates a (previously activated) fuzzy security rule after a period of time such that the attack detection component 140 stops applying the fuzzy security rule to future traffic received by the web application layer proxy 120. For example, the attack detection component 140 may deactivate a fuzzy security rule in response to a determination that the fuzzy security rule has not been triggered for a predefined period of time (e.g., for at least X minutes). As another example, the attack detection component 140 may deactivate a fuzzy security rule in response to a determination, based on applying the prediction model 180 to recently triggered security rules, that the fuzzy security rule is no longer predicted to be triggered.

Exemplary operations for predictively activating security rules will now be described with reference to FIG. 1 to further illustrate an embodiment of the invention. At circle '1' the web application layer proxy 120 sends data regarding sequences of security rules that were previously triggered at the web application layer proxy 120 to the security manager 190. At circle '2' the prediction model generator 195 generates a prediction model 180 based on this data and/or similar data generated by other web application layer proxies (e.g., that belong to the same enterprise and/or belong to different enterprises). At circle '3' the security manager 190 sends the prediction model 180 generated by the prediction model generator 195 to the web application layer proxy 120. At circle '4' the web application layer proxy 120 installs the prediction model 180 in the attack detection component 140. At circle '5' one or more of the web application clients 110 generate and send web application layer requests to one or more of the web application servers 130. The web application layer proxy 120 intercepts/receives the web application layer requests and the attack detection component 140 applies the non-fuzzy security rules 160 to those web application layer requests (but not the fuzzy security rules 170 since they initially remain deactivated), which may cause one or more of the non-fuzzy security rules 160 to be triggered (e.g., if the web application layer requests include or otherwise form an attack). At circle '6' the attack detection component 140 applies the prediction model 180 to the set of security rules that were recently triggered (e.g., the non-fuzzy security rules that were triggered within the last N minutes) to predict which of the fuzzy security rules 170 will be triggered soon. At circle '7' the attack detection component 140 activates the fuzzy security rules that are predicted to be triggered soon. At circle '8' one or more of the web application clients 110 generate and send further web application layer requests to one or more of the web application servers 130. The web application layer proxy 120 intercepts/receives the web application layer requests and this time the attack detection component 140 applies the non-fuzzy security rules 160 as well as the activated fuzzy security rules to the web application layer requests. At circle '9' one or more of the activated fuzzy security rules are triggered, which may cause the web application layer proxy 120 to successfully block malicious web application layer requests. At circle '10' the attack detection component 140 deactivates the activated fuzzy security rules after a period of time (e.g., because those fuzzy security rules have not been triggered for a predefined period of time).

Figure 2:
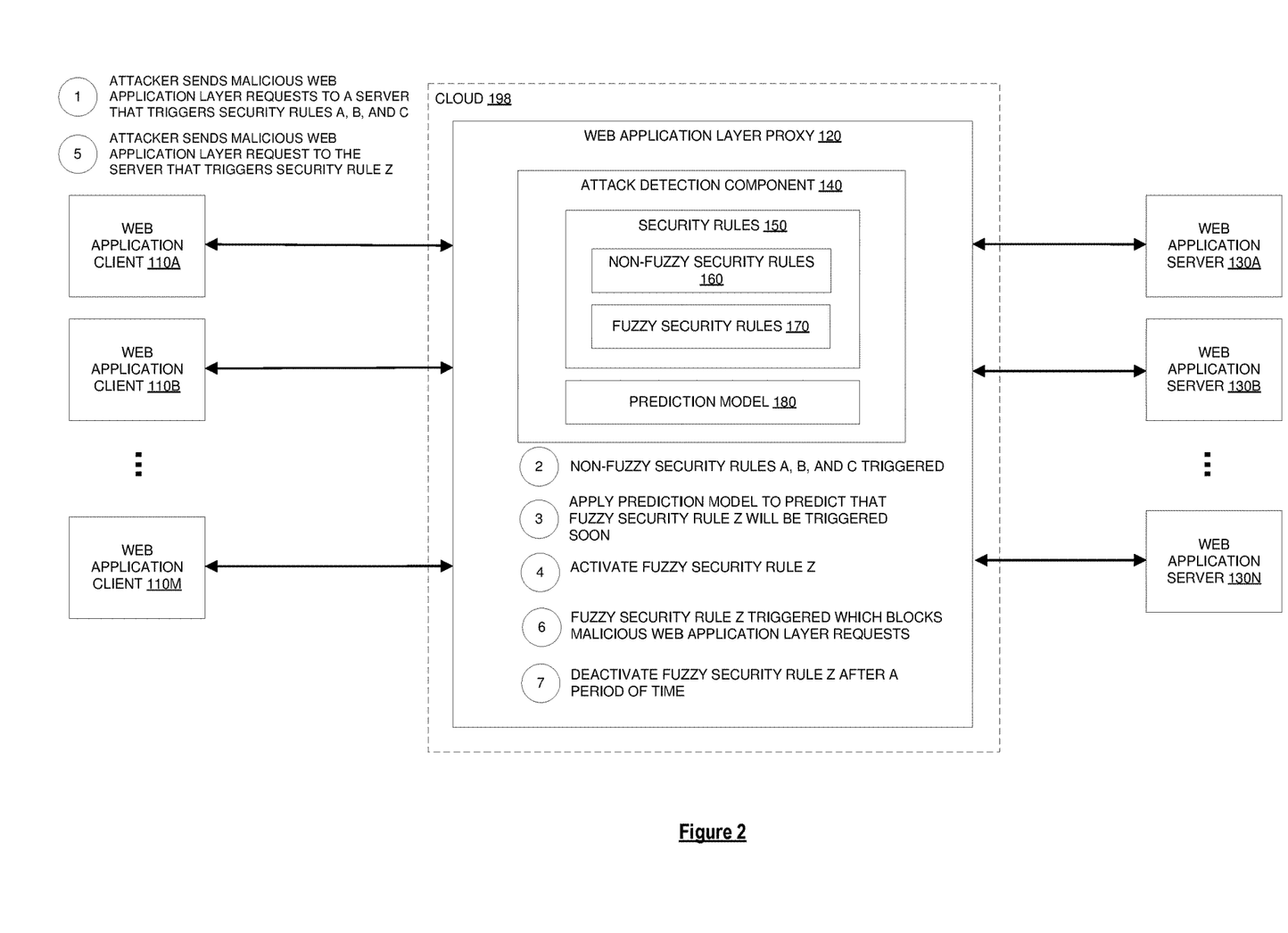
FIG. 2 is a block diagram illustrating exemplary operations of predictively activating security rules, according to some embodiments.

FIG. 2 is a block diagram illustrating exemplary operations of predictively activating security rules, according to some embodiments. The operations illustrated in this diagram provide a more specific example than the operations shown in FIG. 1. At circle '1' an attacker uses one or more web application clients 110 to send malicious web application layer requests to a web application server 130. The web application layer proxy 120 intercepts/receives the web application layer requests and the attack detection component 140 applies the non-fuzzy security rules 160 to the web application layer requests. At circle '2' the web application layer requests cause non-fuzzy security rules A, B, and C to be triggered at the web application layer proxy 120. The attack detection component 140 applies the prediction model 180 to security rules A, B, and C to predict at circle '3' that fuzzy security rule Z will be triggered soon. As a result, at circle '4' the attack detection component 140 activates fuzzy security rule Z. At circle '5' the attacker uses one or more web application clients 110 to send further malicious web application layer requests to the web application server 130. The web application layer proxy 120 intercepts/receives the web application layer requests and the attack detection component 140 applies fuzzy security rule Z to the traffic (since fuzzy security rule Z was activated at circle '4'). At circle '6' the web application layer requests cause fuzzy security rule Z to be triggered, which causes the web application layer proxy 120 to block the web application layer requests. At circle '7' the attack detection component 140 deactivates fuzzy security rule Z after a period of time (e.g., because it is determined that fuzzy security rule Z is no longer predicted to be triggered).

A benefit of embodiments disclosed herein is that they reduce false positives without significantly compromising on security. There are security rules which are useful for detecting malicious traffic but which create many false positives. Applying such security rules to traffic may create many false positives, which harms usability. However, not applying such security rules (or applying such security rules in "do not block" mode (e.g., generate an alert but allow the traffic to go through)) harms security. Thus, there is a tradeoff between usability and security. With embodiments disclosed herein, both usability and security can be achieved by keeping certain security rules (e.g., fuzzy security rules) deactivated during normal operations (thereby reducing false positives) and activating those security rules when it is predicted that an attack that may trigger those security rules will occur soon (thereby providing security).

While the diagram shows that system as including a single web application layer proxy 120, in some embodiments the system may include multiple web application layer proxies 120 (e.g., that are geographically dispersed), which are communicatively coupled between the web application clients 110 and the web application servers 130 to protect the web application servers 130. Also, while the diagram shows an inline deployment (the web application layer proxy 120 is sitting inline to the traffic between the web application clients 110 and the web application servers 130), it should be understood that the techniques described herein can also be implemented in non-inline deployments (e.g., a system that includes a security device that sniffs traffic being sent between the web application clients 110 and the web application servers 130 and applies security rules to that traffic).

Also, it should be understood that in addition to protecting the web application servers 130 against web application attacks, the web application layer proxy 120 may provide various additional functionality depending on the implementation such as content caching, traffic scrubbing, Internet Protocol (IP) address masking, and/or load balancing.

One or more components of the system may be deployed in a cloud (e.g., a cloud provided by a cloud provider such as Amazon®, Microsoft®, etc.) and/or on premise (e.g., in an enterprise network). In an exemplary arrangement, the web application layer proxy 120 is deployed in the cloud 198 while the web application servers 130 are deployed on-premise (in an enterprise network), and any web application layer requests originated by the web application clients 110 that are intended for the web application servers 130 are first directed to the web application layer proxy 120 in the cloud 198 (e.g., by changing Domain Name Service (DNS) records) before being sent to the on-premise web application servers 130. It should be understood that other arrangements are also possible. For example, both the web application layer proxy 120 and the web application servers 130 may be deployed in the cloud or both may be deployed on-premise. In one embodiment, the security manager 190 is deployed in a cloud 197 (which may be the same or different cloud than the cloud 198 in which the web application layer proxy 120 is deployed). In one embodiment, the security manager 190 is communicatively coupled to multiple web application layer proxies (e.g., that belong to different enterprises) and can receive data regarding sequences of security rules that were previously triggered at those respective web application layer proxies, which can then be used by the prediction model generator 195 to generate the prediction model 180 (thus the prediction model 180 can be generated based on data provided by a "community" of web application layer proxies). Also, the security manager 190 may provide the prediction model 180 to multiple web application layer proxies so that each of those web application layer proxies can use the prediction model 180 to predictively activate security rules.

Figure 3:
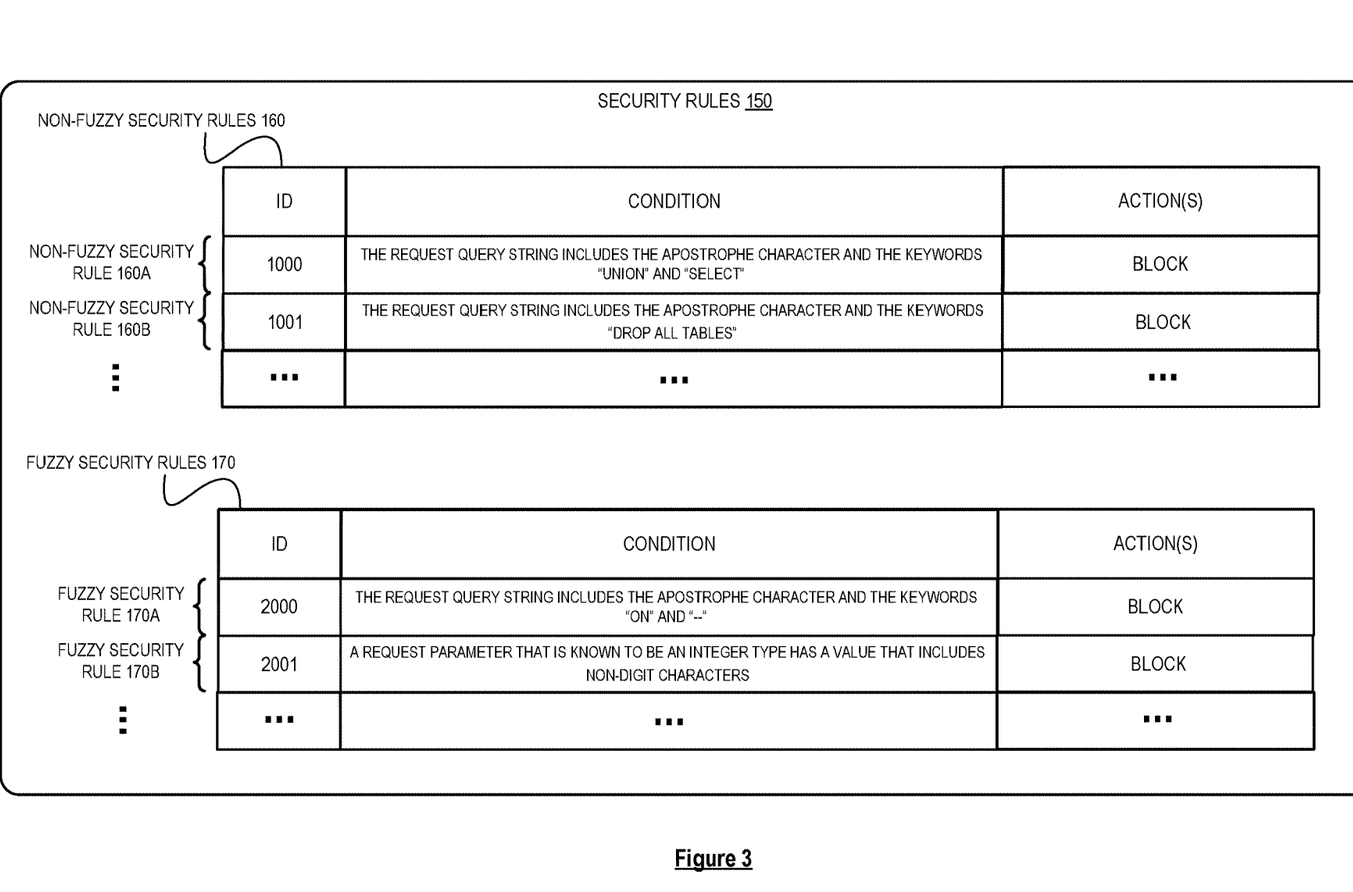
FIG. 3 is a diagram illustrating exemplary security rules, according to some embodiments.

FIG. 3 is a diagram illustrating exemplary security rules, according to some embodiments. As shown in the diagram, the security rules 150 include non-fuzzy security rules 160 and fuzzy security rules 170. The non-fuzzy security rules 160 include, among other security rules, non-fuzzy security rule 160A and non-fuzzy security rule 160B. Non-fuzzy security rule 160A is assigned ID "1000" and includes a condition specifying that the request query string includes the apostrophe character and the keywords "UNION" and "SELECT." Non-fuzzy security rule 160A also includes an action to block the request. Non-fuzzy security rule 160B is assigned ID "1001" and includes a condition specifying that the request query string includes the apostrophe character and the keywords "DROP ALL TABLES." Non-fuzzy security rule 160B also includes an action to block the request. Non-fuzzy security rules 160A and 160B are examples of security rules that can be used to detect and block SQL Injection attacks.

The fuzzy security rules 170 include, among other security rules, fuzzy security rule 170A and fuzzy security rule 170B. Fuzzy security rule 170A is assigned ID "2000" and includes a condition specifying that the request query string includes the apostrophe character and the keywords "ON" and "—." Fuzzy security rule 170A also includes an action to block the request. Fuzzy security rule 170B is assigned ID "2001" and includes a condition specifying that a request parameter that is known to be an integer type has a value that includes non-digit characters. Fuzzy security rule 170B also includes an action to block the request. Fuzzy security rules 170A and 170B are examples of more "aggressive" or "tightened" security rules that can be used to detect and block SQL Injection attacks (e.g., these security rules may have been determined to create false positives if applied during normal operations (e.g., during peacetime) but are useful for detecting attacks when a SQL Injection attack has begun).

If the attack detection component 140 determines that traffic directed to a particular URL of a website recently triggered non-fuzzy security rules 160A and 160B, then the attack detection component 140 may activate one or more of the fuzzy security rules 170A and 170B to provide more focused/aggressive security. In one embodiment, the attack detection component 140 activates fuzzy security rules only for particular traffic (and not for all traffic received/intercepted by the web application layer proxy 120). For example, the attack detection component 140 may activate fuzzy security rule 170A only for traffic directed to the same URL to which the traffic that triggered the non-fuzzy security rules was directed (but not other URLs), activate fuzzy security rule 170B for all traffic to the website (e.g., traffic directed to any URL of the website/domain), activate fuzzy security rule 170B for traffic originating from the same IP address that originated the traffic that triggered the non-fuzzy security rules, and/or activate fuzzy security rule 170B for traffic originating from the same user agent (e.g., web browser version) that triggered the non-fuzzy security rules. In one embodiment, the triggering of fuzzy security rules can cause the attack detection component 140 to activate additional fuzzy security rules (e.g., the attack detection component 140 may determine that additional fuzzy security rules are predicted to be triggered soon based on applying the prediction model 180 to the triggered fuzzy security rules).

While specific security rules are shown in the diagram, it should be understood that these are provided by way of example to aid in the understanding of the invention, and that the security rules 150 (the non-fuzzy and/or fuzzy security rules) can be configured differently depending on the security needs.

Figure 4:
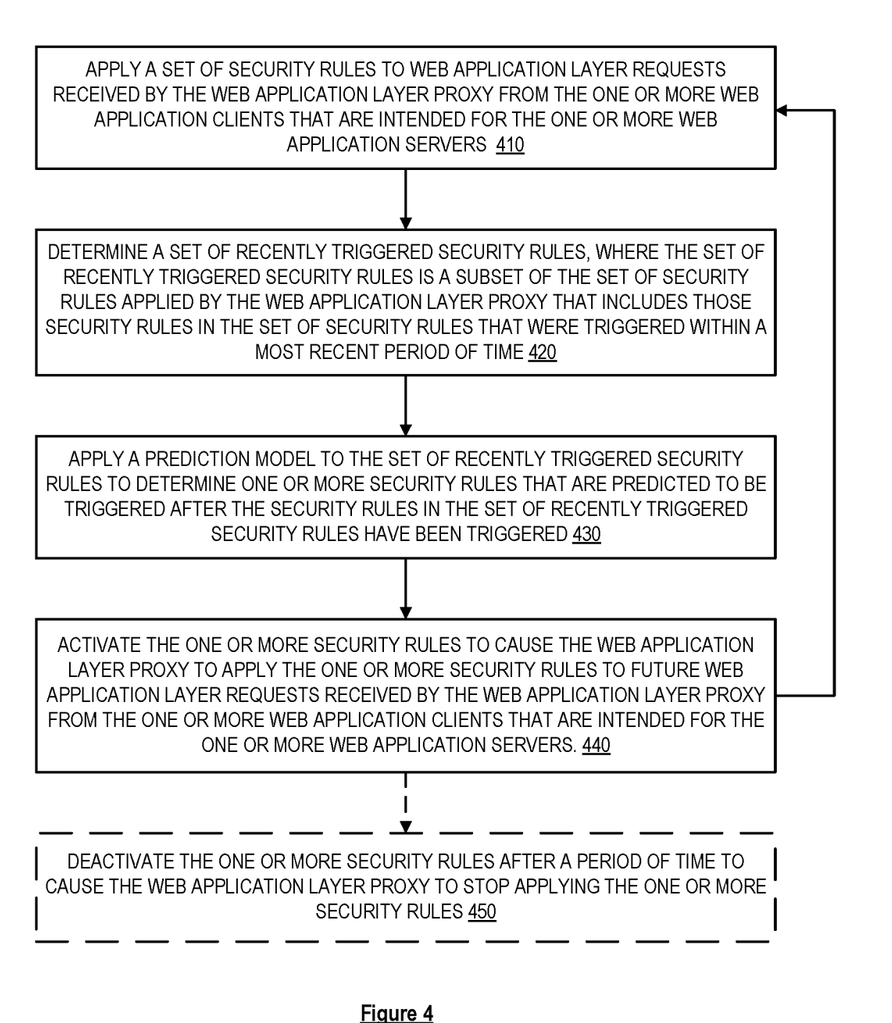
FIG. 4 is a flow diagram of a process for predictively activating security rules, according to some embodiments.

FIG. 4 is a flow diagram of a process for predictively activating security rules, according to some embodiments. In one embodiment, the process is implemented by a web application layer proxy (e.g., web application layer proxy 120), where the web application layer proxy is communicatively coupled between one or more web application clients and one or more web application servers. The process may be implemented using hardware, software, firmware, or any combination thereof.

At block 410, the web application layer proxy applies a set of security rules to web application layer requests received by the web application layer proxy from the one or more web application clients that are intended for the one or more web application servers.

At block 420, the web application layer proxy determines a set of recently triggered security rules, where the set of recently triggered security rules is a subset of the set of security rules applied by the web application layer proxy that includes those security rules in the set of security rules that were triggered within a most recent period of time (e.g., the last N minutes).

At block 430, the web application layer proxy applies a prediction model to the set of recently triggered security rules to determine one or more security rules that are predicted to be triggered after the security rules in the set of recently triggered security rules have been triggered. In one embodiment, the prediction model is generated based on analyzing sequences of security rules that were previously triggered at one or more web application layer proxies. The prediction model may be generated, for example, using a natural language processing approach or a Bayesian approach. In an embodiment that uses the natural language processing approach, the prediction model may be generated based on representing security rules as words, representing the sequences of security rules that were previously triggered as sentences, and applying a natural language processing algorithm to the sentences to arrange the security rules in a vector space, where distances between security rules in the vector space represent a likelihood that those security rules are triggered in the same context (e.g., close in time/order). In such an embodiment, the prediction model may be applied to determine the one or more security rules based on determining security rules that are within a predefined distance in the vector space from the security rules in the set of recently triggered security rules. In an embodiment that uses a Bayesian approach, the prediction model may be generated based on determining conditional probabilities for pairs of security rules in the sequences of security rules that were previously triggered, where a conditional probability for a pair of security rules indicates a probability that a first security rule in the pair of security rules is triggered within a predefined period of time after a second security rule in the pair of security rules has been triggered. In such an embodiment, the prediction model may be applied to determine the one or more security rules based on determining, based on the conditional probabilities, security rules having a probability that is higher than a predefined threshold probability of being triggered within the predefined period of time after the security rules in the set of recently triggered security rules have been triggered.

At block 440, the web application layer proxy activates the one or more security rules to cause the web application layer proxy to apply the one or more security rules to future web application layer requests received by the web application layer proxy from the one or more web application clients that are intended for the one or more web application servers. In one embodiment, the one or more security rules that are activated are not included in the set of security rules that was previously applied by the web application layer proxy. The process may then proceed back to block 410, where the web application layer proxy repeats blocks 410-440 for further web application layer requests received by the web application layer proxy (which may involve applying the one or more security rules that were activated to the further web application layer requests received by the web application layer proxy).

In one embodiment, at block 450, the web application layer proxy deactivates the one or more security rules that were activated after a period of time to cause the web application layer proxy to stop applying the one or more security rules. In one embodiment, the one or more security rules are deactivated in response to a determination that the one or more security rules have not been triggered for a predefined period of time. Additionally or alternatively, in one embodiment, the one or more security rules are deactivated in response to a determination, based on applying the prediction model, that the one or more security rules are no longer predicted to be triggered.

In one embodiment, the web application layer proxy generates the prediction model itself. In another embodiment, the web application layer proxy receives the prediction model from a security manager (e.g., security manager 190). For example, the web application layer proxy may send data regarding security rules that were previously triggered at the web application layer proxy to the security manager, where the security manager is to use the data to generate the prediction model. The web application layer proxy may then receive the prediction model from the security manager and install the prediction model in the web application layer proxy (e.g., so that it can be used by the attack detection component 140 of the web application layer proxy to predictively activate security rules).

FIG. 5 is a flow diagram of a process for generating a prediction model, according to some embodiments. In one embodiment, the process is implemented by a security manager (e.g., security manager 190) or similar entity. In another embodiment, the process is implemented by a web application layer proxy. For sake of illustration, the process is described as being implemented by a security manager. The process may be implemented using hardware, software, firmware, or any combination thereof.

At block 510, the security manager obtains data regarding sequences of security rules that were previously triggered at one or more web application layer proxies.

At block 520, the security manager generates a prediction model based on analyzing the sequences of security rules that were previously triggered at the one or more web application layer proxies. The prediction model may be generated using a natural language processing approach or a Bayesian approach. With the natural language processing approach, at block 530, the security manager represents security rules as words, represents the sequences of security rules that were previously triggered as sentences, and applies a natural language processing algorithm to the sentences to arrange the security rules in a vector space, where distances between security rules in the vector space represent a likelihood that those security rules are triggered in the same context. A web application layer proxy may apply the prediction model to a set of recently triggered security rules by determining which security rules are within a predefined distance in the vector space from the security rules in the set of recently triggered security rules. With the Bayesian approach, at block 540, the security manager determines conditional probabilities for pairs of security rules in the sequences of security rules that were previously triggered, where a conditional probability for a pair of security rules indicates a probability that a first security rule in the pair of security rules will be triggered within a predefined period of time after a second security rule in the pair of security rules is triggered. A web application layer proxy may apply the prediction model to a set of recently triggered security rules by determining, based on the conditional probabilities, security rules having a probability that is higher than a predefined threshold probability of being triggered within the predefined period of time after the security rules in the set of recently triggered security rules have been triggered.

In one embodiment, at block 550, the security manager provides the prediction model to a web application layer proxy, where the web application layer proxy is to apply the prediction model to predictively activate security rules.

While various embodiments have been disclosed herein for predictively activating security rules to protect web application servers from attacks by web application clients, it should be understood that the techniques disclosed herein can be applied in other contexts besides web applications. For example, the techniques described herein can be used to predictively activate security rules to protect database servers, file servers, email servers, and the like. Also, while various embodiments have been disclosed herein that apply security rules to web application layer requests, it should be understood that the techniques disclosed herein can also be applied to web application layer responses that are generated by web application servers and intended for web application clients.

Figure 6:
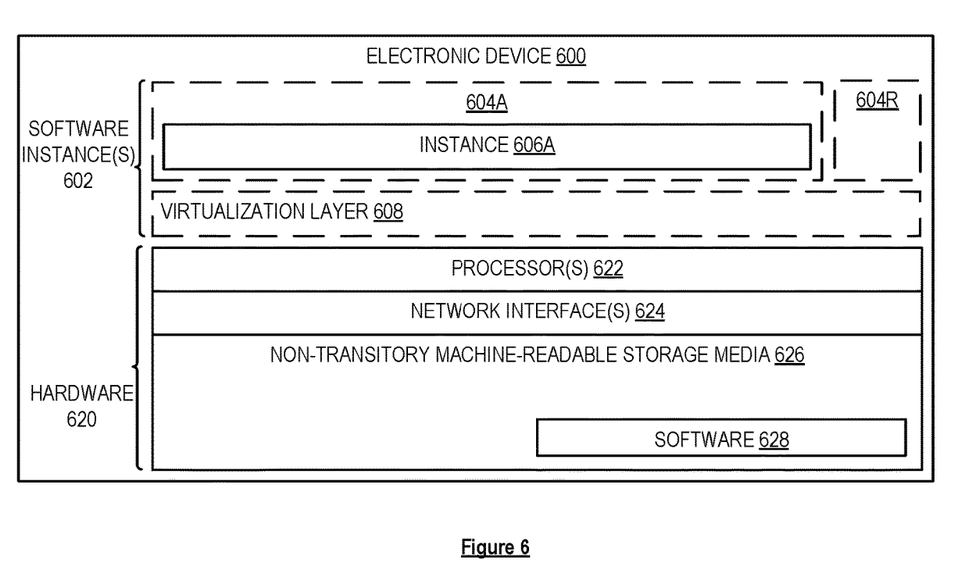
FIG. 6 is a block diagram illustrating an electronic device, according to some embodiments.

FIG. 6 is a block diagram illustrating an electronic device, according to some embodiments. FIG. 6 illustrates hardware 620 comprising a set of one or more processor(s) 622, a set of one or more network interfaces 624 (wireless and/or wired), and non-transitory machine-readable storage medium/media 626 having stored therein software 628 (which includes instructions executable by the set of one or more processor(s) 622). Software 628 can include code, which when executed by hardware 620, causes the electronic device 600 to perform operations of one or more embodiments described herein (e.g., operations for predictively activating security rules and/or operations for generating a prediction model). Thus, as previously described, the web application layer proxy 120, the web application servers 130, and/or the security manager 190 may each be implemented by one or more electronic devices.

In electronic devices that use compute virtualization, the set of one or more processor(s) 622 typically execute software to instantiate a virtualization layer 608 and software container(s) 604A-R (e.g., with operating system-level virtualization, the virtualization layer 608 represents the kernel of an operating system (or a shim executing on a base operating system) that allows for the creation of multiple software containers 604A-R (representing separate user space instances and also called virtualization engines, virtual private servers, or jails) that may each be used to execute a set of one or more applications; with full virtualization, the virtualization layer 608 represents a hypervisor (sometimes referred to as a virtual machine monitor (VMM)) or a hypervisor executing on top of a host operating system, and the software containers 604A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 628 (illustrated as instance 606A) is executed within the software container 604A on the virtualization layer 608. In electronic devices where compute virtualization is not used, the instance 606A on top of a host operating system is executed on the "bare metal" electronic device 600. The instantiation of the instance 606A, as well as the virtualization layer 608 and software containers 604A-R if implemented, are collectively referred to as software instance(s) 602.

Alternative implementations of an electronic device may have numerous variations from that described above. For example, customized hardware and/or accelerators might also be used in an electronic device.

The techniques shown in the figures can be implemented using code and data stored and executed on one or more electronic devices (e.g., an end station, a network device). Such electronic devices, which are also referred to as computing devices, store and communicate (internally and/or with other electronic devices over a network) code and data using computer-readable media, such as non-transitory machine-readable storage media (e.g., magnetic disks, optical disks, random access memory (RAM), read-only memory (ROM); flash memory, phase-change memory) and transitory computer-readable communication media (e.g., electrical, optical, acoustical or other form of propagated signals, such as carrier waves, infrared signals, digital signals). In addition, electronic devices include hardware, such as a set of one or more processors coupled to one or more other components, e.g., one or more non-transitory machine-readable storage media to store code and/or data, and a set of one or more wired or wireless network interfaces allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses, bridges). Thus, the non-transitory machine-readable storage media of a given electronic device typically stores code (i.e., instructions) for execution on the set of one or more processors of that electronic device. Of course, various parts of the various embodiments presented herein can be implemented using different combinations of software, firmware, and/or hardware. As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, switching), and/or provide support for multiple application services (e.g., data, voice, and video).

The operations in the flow diagrams have been described with reference to the exemplary embodiments of the other diagrams. However, it should be understood that the operations of the flow diagrams can be performed by embodiments of the invention other than those discussed with reference to these other diagrams, and the embodiments of the invention discussed with reference these other diagrams can perform operations different than those discussed with reference to the flow diagrams.

Similarly, while the flow diagrams in the figures show a particular order of operations performed by certain embodiments, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method by a web application layer proxy implemented by one or more network devices for predictively activating security rules to protect one or more web application servers from attacks by one or more web application clients, wherein the web application layer proxy is communicatively coupled between the one or more web application clients and the one or more web application servers, the method comprising:
    applying a set of security rules to web application layer requests received by the web application layer proxy from the one or more web application clients that are intended for the one or more web application servers;
    determining a set of recently triggered security rules, wherein the set of recently triggered security rules is a subset of the set of security rules applied by the web application layer proxy which includes those security rules in the set of security rules that were triggered within a most recent period of time;
    applying a prediction model to the set of recently triggered security rules to determine one or more security rules that are stored in the web application proxy and currently deactivated but predicted to be triggered after the security rules in the set of recently triggered security rules have been triggered; and
    activating the one or more security rules to cause the web application layer proxy to apply the one or more security rules to future web application layer requests received by the web application layer proxy from the one or more web application clients that are intended for the one or more web application servers.

2. The method of claim 1, further comprising:
    deactivating the one or more security rules after a period of time to cause the web application layer proxy to stop applying the one or more security rules.

3. The method of claim 2, wherein the one or more security rules are deactivated in response to a determination that the one or more security rules have not been triggered for a predefined period of time.

4. The method of claim 2, wherein the one or more security rules are deactivated in response to a determination, based on applying the prediction model, that the one or more security rules are no longer predicted to be triggered.

5. The method of claim 1, wherein the prediction model is generated based on analyzing sequences of security rules that were previously triggered at one or more web application layer proxies.

6. The method of claim 5, wherein the prediction model is generated based on representing security rules as words, representing the sequences of security rules that were previously triggered as sentences, and applying a natural language processing algorithm to the sentences to arrange the security rules in a vector space, wherein distances between security rules in the vector space represent a likelihood that those security rules are triggered in the same context.

7. The method of claim 6, wherein the prediction model is applied to determine the one or more security rules based on determining security rules that are within a predefined distance in the vector space from the security rules in the set of recently triggered security rules.

8. The method of claim 5, wherein the prediction model is generated based on determining conditional probabilities for pairs of security rules in the sequences of security rules that were previously triggered, wherein a conditional probability for a pair of security rules indicates a probability that a first security rule in the pair of security rules is triggered within a predefined period of time after a second security rule in the pair of security rules has been triggered.

9. The method of claim 8, wherein the prediction model is applied to determine the one or more security rules based on determining, based on the conditional probabilities, security rules having a probability that is higher than a predefined threshold probability of being triggered within the predefined period of time after the security rules in the set of recently triggered security rules have been triggered.

10. The method of claim 1, wherein the one or more security rules that are activated are not included in the set of security rules that was previously applied by the web application layer proxy.

11. The method of claim 1, further comprising:
    sending data regarding security rules that were previously triggered at the web application layer proxy to a security manager, wherein the security manager is to use the data to generate the prediction model;

receiving the prediction model from the security manager; and installing the prediction model in the web application layer proxy.

12. A set of one or more non-transitory machine-readable storage media storing instructions which, when executed by one or more processors of one or more network devices implementing a web application layer proxy that is communicatively coupled between one or more web application clients and one or more web application servers, causes the one or more network devices to perform operations for predictively activating security rules to protect the one or more web application servers from attacks by the one or more web application clients, the operations comprising:

applying a set of security rules to web application layer requests received by the web application layer proxy from the one or more web application clients that are intended for the one or more web application servers;

determining a set of recently triggered security rules, wherein the set of recently triggered security rules is a subset of the set of security rules applied by the web application layer proxy which includes those security rules in the set of security rules that were triggered within a most recent period of time;

applying a prediction model to the set of recently triggered security rules to determine one or more security rules that are stored in the web application proxy and currently deactivated but predicted to be triggered after the security rules in the set of recently triggered security rules have been triggered; and activating the one or more security rules to cause the web application layer proxy to apply the one or more security rules to future web application layer requests received by the web application layer proxy from the one or more web application clients that are intended for the one or more web application servers.

13. The set of one or more non-transitory machine-readable storage media of claim 12, wherein the operations further comprise:

deactivating the one or more security rules after a period of time to cause the web application layer proxy to stop applying the one or more security rules.

14. The set of one or more non-transitory machine-readable storage media of claim 13, wherein the one or more security rules are deactivated in response to a determination that the one or more security rules have not been triggered for a predefined period of time.

15. The set of one or more non-transitory machine-readable storage media of claim 13, wherein the one or more security rules are deactivated in response to a determination, based on applying the prediction model, that the one or more security rules are no longer predicted to be triggered.

16. The set of one or more non-transitory machine-readable storage media of claim 12, wherein the prediction model is generated based on analyzing sequences of security rules that were previously triggered at one or more web application layer proxies.

17. A network device configured to implement a web application layer proxy that is to be communicatively coupled between one or more web application clients and one or more web application servers, wherein the web application layer proxy is configured to predictively activate security rules to protect the one or more web application servers from attacks by the one or more web application clients, the network device comprising:

one or more processors; and a non-transitory machine-readable storage medium having instructions stored therein, which when executed by the one or more processors, causes the network device implementing the web application layer proxy to:

apply a set of security rules to web application layer requests received by the web application layer proxy from the one or more web application clients that are intended for the one or more web application servers, determine a set of recently triggered security rules, wherein the set of recently triggered security rules is a subset of the set of security rules applied by the web application layer proxy which includes those security rules in the set of security rules that were triggered within a most recent period of time, apply a prediction model to the set of recently triggered security rules to determine one or more security rules that are stored in the web application proxy and currently deactivated but predicted to be triggered after the security rules in the set of recently triggered security rules have been triggered, and activate the one or more security rules to cause the web application layer proxy to apply the one or more security rules to future web application layer requests received by the web application layer proxy from the one or more web application clients that are intended for the one or more web application servers.

18. The network device of claim 17, wherein the instructions which when executed by the one or more processors, further causes the network device implementing the web application layer proxy to:

deactivate the one or more security rules after a period of time to cause the web application layer proxy to stop applying the one or more security rules.

19. The network device of claim 17, wherein the prediction model is generated based on analyzing sequences of security rules that were previously triggered at one or more web application layer proxies.

20. The network device of claim 17, wherein the instructions which when executed by the one or more processors, further causes the network device implementing the web application layer proxy to:

send data regarding security rules that were previously triggered at the web application layer proxy to a security manager, wherein the security manager is to use the data to generate the prediction model, receive the prediction model from the security manager, and install the prediction model in the web application layer proxy.

* * * * *